US005522601A

United States Patent [19]
Murphy

[11] Patent Number: 5,522,601
[45] Date of Patent: Jun. 4, 1996

[54] LOCKING LABYRINTH SEALING ASSEMBLY

[75] Inventor: Patrick T. Murphy, Auburn, N.Y.

[73] Assignee: Goulds Pumps, Incorporated, Fairport, N.Y.

[21] Appl. No.: 183,153

[22] Filed: Jan. 18, 1994

[51] Int. Cl.$^6$ ............................................. F16J 15/447
[52] U.S. Cl. .............................. 277/53; 277/56; 277/57
[58] Field of Search ............................ 277/35, 37, 38, 277/53, 56, 57, 193, 199

[56] References Cited

U.S. PATENT DOCUMENTS

| | | | |
|---|---|---|---|
| 3,893,674 | 7/1975 | Paradine | 277/56 |
| 4,706,968 | 11/1987 | Orlowski | 277/53 |
| 4,743,034 | 5/1988 | Kakabaker et al. | 277/56 X |
| 4,890,941 | 1/1990 | Calafell, II et al. | 277/56 X |
| 4,981,303 | 1/1991 | Matsushima et al. | 277/53 X |
| 5,024,451 | 6/1991 | Borowski | 277/57 X |
| 5,040,804 | 8/1991 | Back | 277/53 X |
| 5,074,567 | 12/1991 | Orlowski . | |
| 5,316,317 | 5/1994 | Fedorovich et al. | 277/53 X |
| 5,378,000 | 1/1995 | Orlowski | 277/53 X |

OTHER PUBLICATIONS

Goulds Pump, Bulletin 725.1, Dec., 1991.
Goulds Pump, Bulletin 723.9, Jan. 1991.
Goulds Pump, Bulletin 725.9, Feb., 1991.
Face to Face, The Sealing Technology Magazine, vol. IV, No. 1, Spring, 1993.

*Primary Examiner*—Scott W. Cumings
*Attorney, Agent, or Firm*—Brezina & Ehrlich

[57] ABSTRACT

An interlocking labyrinth sealing assembly for sealing about a rotary shaft. The assembly includes a stator element having a forward extending lip which forms a radially inward extending groove and a rotor element which has a flange which extends outwardly about the lip and includes a downwardly depending rim which extends into the groove to place and maintain the rotor in a desired position relative to the stator so that a labyrinth seal is established between the rotor and stator. The lip of the stator also includes a sloped guiding surface to outwardly deflect the flange of the rotor so that the rim may be positioned within the groove.

20 Claims, 3 Drawing Sheets

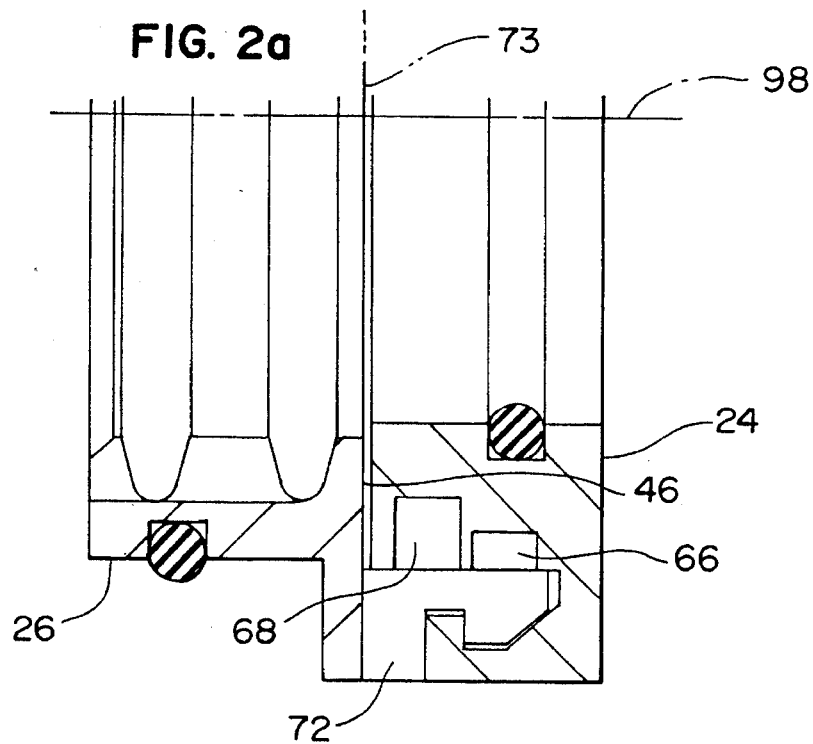
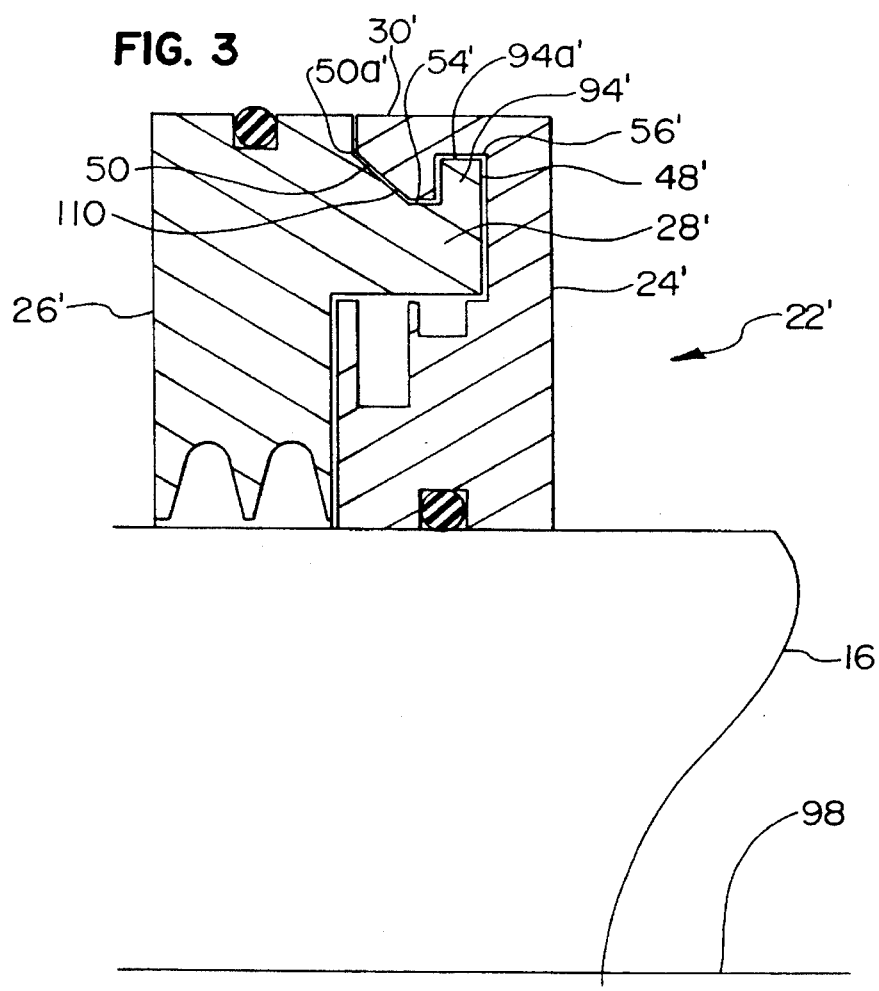

LOCKING LABYRINTH SEALING ASSEMBLY

FIELD OF THE INVENTION

The invention relates generally to seals for use on rotating shafts in various types of machinery. The invention relates specifically to mechanical labyrinth seals including a rotor driven by a shaft and an associated stationary stator.

BACKGROUND OF THE INVENTION

In machines such as centrifugal pumps with rotating shafts, it is frequently necessary to obtain an effective seal between the rotating shafts and stationary elements of the machine. These rotating shaft seals may find particular application in bearing housings to prevent lubricants, used to lubricate bearing elements such as ball and thrust bearings, from leaking out of the housing. Another important function of the rotating shaft seals for bearing housings is to prevent contaminants, such as dirt, dust, water, pump leakage and condensation from entering the bearing housing.

The entrance of contaminants within a bearing housing can pose a serious threat to the lubricating fluid contained therein. Should contaminants enter a bearing housing, the lubrication of the bearings by the lubricating fluid can be substantially impaired. A loss of lubrication may cause bearings to operate at excessive temperatures, which can lead to premature failure of the bearings and subsequent failure of the pump or other device that the bearing housing is incorporated into.

The escape of lubricants from the bearing housing through the shaft seals is capable of causing similar problems. Frequent servicing may be required to replace escaping lubricants. Also, the leakage of lubricant from the bearing housing may cause an inadequate amount of lubrication fluid in the housing such that excessive wear will take place, which can eventually cause premature bearing failure.

One type of sealing device used to provide a seal about rotating shafts and particularly about shafts extending through bearing housings are mechanical labyrinth seals. These seals commonly incorporate a rotating element or rotor and a stationary element or stator. In the labyrinth seal, opposing faces of the stator and rotor are configured to form a maze or labyrinth flow path along an interface between the rotor and stator. In addition, the opposing faces are machined to a tight tolerance so that the separation or gap between the opposing faces of the rotor and stator is very narrow. The labyrinth path created by the labyrinth sealing elements and narrow separation inhibits the leakage of lubricants between the rotating rotor and stationary stator and out of the seal. Similarly, the labyrinth inhibits the entrance of contaminants into the bearing through the rotor and stator.

Seals between the labyrinth rotor and shaft and between the labyrinth stator and bearing housing are commonly provided by the use of O-rings and O-ring grooves. The O-ring seal between the shaft and rotor may also function to affix the rotor to the shaft.

One of the major problems with labyrinth seals is for the seals to provide an effective seal while maintaining the narrow separation along the interface between the faces of the stator and rotor during rotation of the shaft. Should the rotor separate from the stator, and the separation along the interface between the faces increase even slightly, lubricants and/or contaminants may flow freely through the interface between the rotor and stator thus negating the sealing capability of the seal. Numerous factors may lead to this type of separation, such as vibration, improper maintenance of the machine and seal, and improper installation of the seal or shaft.

Solutions to address this problem have included various methods for locking a rotor and stator together. Some methods utilized additional O-rings, additional locking rings of various materials, and means introducing additional parts into the seal. The employment of additional parts can increase the complexity and unreliability of the seal as well as the cost of manufacture.

SUMMARY OF THE PRESENT INVENTION

It is therefore an object of the present invention to provide an improved labyrinth seal for sealing between a rotating shaft and a stationery element. More particularly it is an object of the present invention to provide such a labyrinth seal which maintains the desired separation of a rotor and stator of the labyrinth seal during operation.

A further object of the invention is to accomplish the above objects with a labyrinth seal which is cost-efficient, reliable, and easy to manufacture.

Applications for seals in accordance with the present invention include use in tool spindles, process pumps, motors, gear housings and other equipment having rotating tubular elements. A preferred embodiment is described with reference to use in a centrifugal pump.

A pump incorporating the preferred embodiment of the present invention includes an impeller which rotates within an impeller housing to pressurize fluid within the housing. The impeller is attached to a forward end of a rotary shaft which extends into the impeller housing. The rearward end of the rotary shaft is connected to a device such as a motor which selectively rotates the shaft. Between the motor and impeller housing, the shaft extends through a bearing housing. At both the radial and thrust ends of the bearing housing are labyrinth sealing assemblies constructed in accordance with the present invention.

The labyrinth sealing assembly includes a rotor which is sealingly mounted about and driven by the shaft. The rotor forms a series of surfaces which are directly opposite a series of faces formed on a stator. The stator is sealingly mounted to the bearing housing. A labyrinth seal is formed in the interface between the opposing faces of the rotor and the stator.

Formed integrally as a part of the stator and extending outward from the stator is a lip. A radially extending groove is formed in an upper annular surface of the lip. The rotor forms a rearward extending annular flange which fits about the lip and includes a radially downward depending rim which is received within the groove forming an interference fit with the stator while allowing rotation of the rotor relative to the stator. To form the interference fit, the shapes of the lip and flange are such that when the rotor is pushed axially against the stator, the stator lip causes the rearward end of the flange of the rotor to temporarily deflect. The rotor and stator may then be pressed together until the rim is axially aligned with the groove and snaps into the groove to lock the rotor and stator into the proper operating position.

The size of the lip and flange is sufficient to maintain the rotor and stator in proper position during operation and maintenance of the pump. The shape and size of the lip and groove insure proper installation and the snap and lock action maintains desired positional relationship between the rotor and stator during rotation of the rotor relative to the stator.

Similarly, the stator may include the annular flange and the rotor may include the extending lip.

BRIEF DESCRIPTION OF THE DRAWING

FIG. 2a is a sectional view of the lower half of the preferred embodiment of the labyrinth sealing assembly shown in FIG. 1; and FIG. 3 is a sectional view of the upper half of an alternate embodiment of the labyrinth sealing assembly of the present invention.

DETAILED DESCRIPTION OF THE PREFERRED EMBODIMENT

Figure 1:
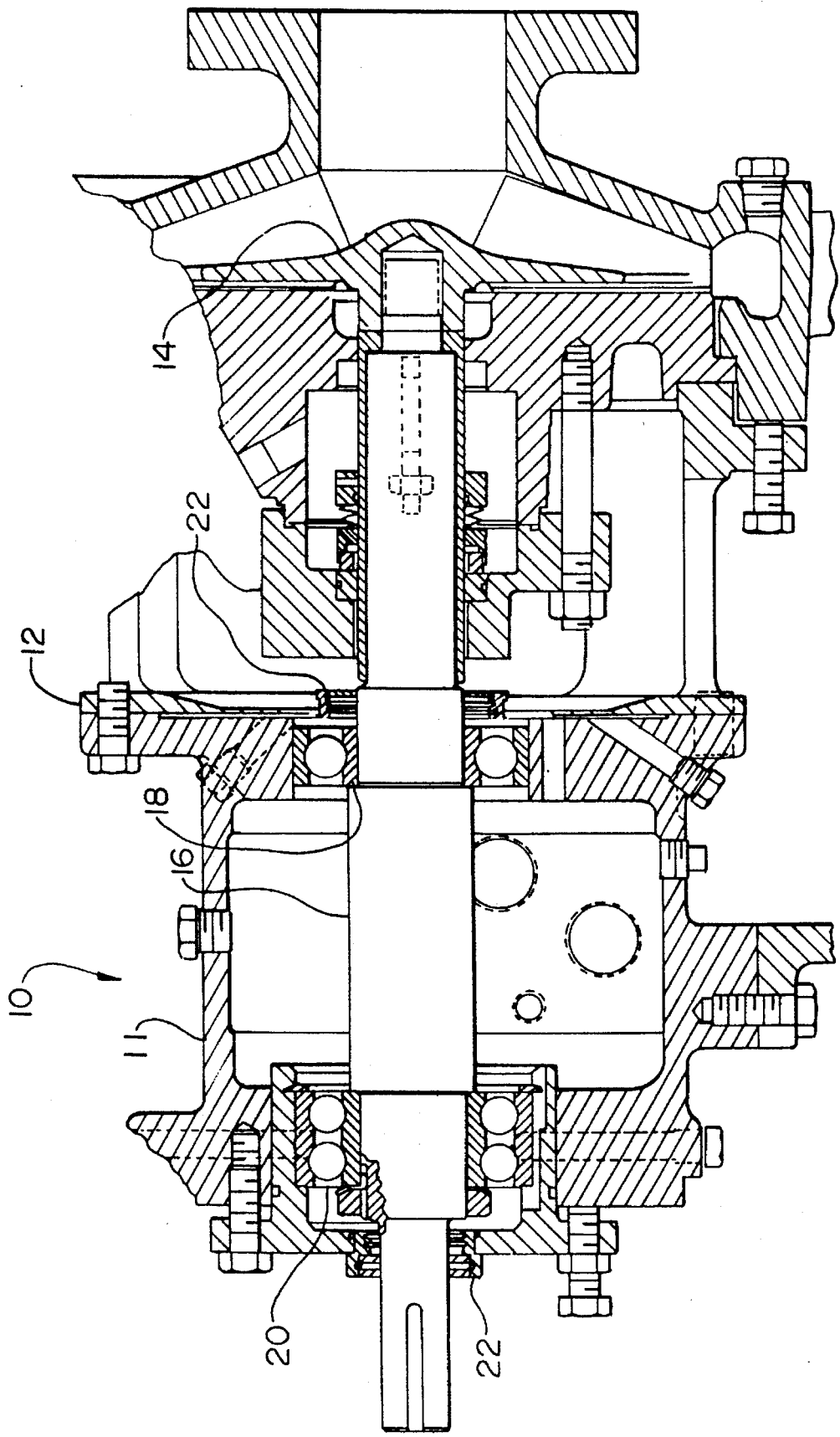
FIG. 1 is a partial vertical section of a pump having a bearing housing which incorporates a labyrinth sealing assembly in accordance with a preferred embodiment of the present invention.

Referring to FIG. 1, a centrifugal pump is generally indicated at 10. The pump includes a bearing housing 11 which is boltingly attached to a forward impeller housing 12. Within the impeller housing 12 is an impeller 14 which is rotatably driven by a shaft 16 which extends through the bearing housing 11 and into the impeller housing where the shaft operably engages the impeller 14. The bearing housing 11 positions a forward radial bearing 18 and rearward thrust bearing 20. The forward and rearward bearings 18 and 20 rotatably support the shaft 16 and the rearward thrust bearing 20 compensates for the axial thrust loads exerted on the shaft by the rotation of the impeller. Lubricating fluid such as oil is contained within the bearing housing 11 to lubricate the radial bearing 18 and thrust bearing 20. To prevent the leakage of fluid from the stationary bearing housing 11 along the rotating shaft 16, the pump 10 includes forward and rearward mechanical labyrinth seal assemblies 22 according to a preferred embodiment of the present invention.

Figure 2:
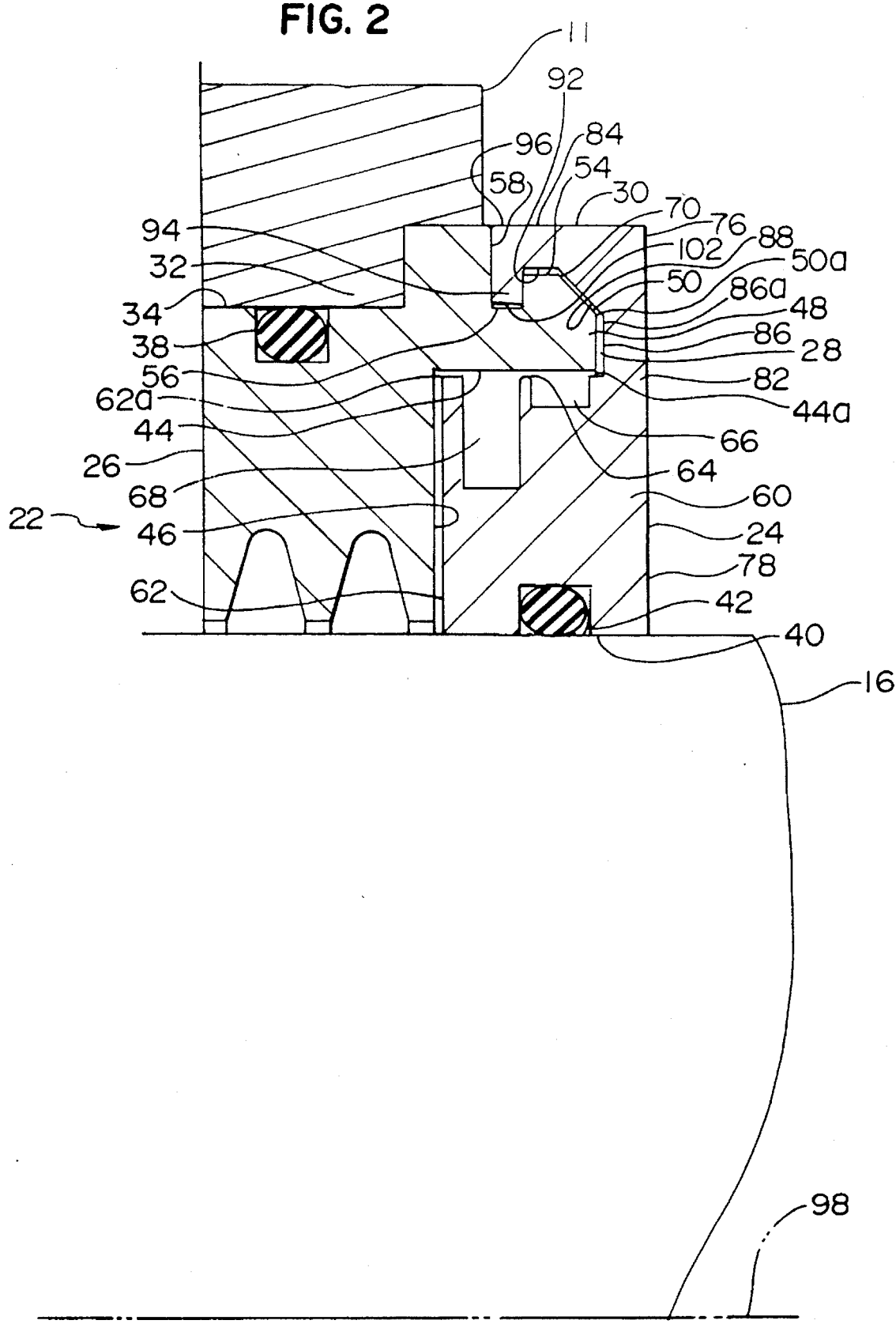
FIG. 2 is a sectional view of the upper half of the preferred embodiment of the labyrinth sealing assembly shown in FIG. 1.

Referring to FIG. 2, the forward seal assembly 22 includes a generally radially extending rotor 24 having a rearward face complimentary to a forward face of a generally radially extending stator 26. The rotor 24 and stator 26 are maintained in their relative positions notwithstanding adverse operating and maintenance conditions by a lip 28 formed integrally as a part of the stator 26 which forms a rotatable interference fit with an outer annular flange 30 formed integrally as part of the rotor 24. The lip 28 may also be formed as an integral part of the rotor 24 and the flange may also be formed as an integral part of the stator 26.

The stator 26 is sealingly mounted to a shoulder 32 formed in the bearing housing 11. An outer annular surface 34 of the stator 26 is configured to fit within the shoulder 32. The stator 26 includes an O-ring sealing arrangement 38 located in the annular surface 32. The O-ring 38 prevents the leakage of fluid along the interface formed between the stator 26 and bearing housing 11.

Circumscribing and extending generally outward from the shaft 16 is the rotor 24. The rotor 24 has an inner annular surface 40 which circumscribes and is sealingly engaged to the shaft 16 by an O-ring sealing arrangement 42 located along the surface 40. The O-ring sealing arrangement operably engages the rotor 24 to the shaft 16 so that the rotor is driven by the shaft and creates a seal to prevent leakage along the shaft 16 between the rotor 24 and the shaft 16.

The lip 28 is preferably formed as an integral part of the stator 26 and includes a lower annular surface 44 which extends forward from an inner radial surface 46 of the stator 26. Extending radially outward from a forward edge 44a of the lower annular surface 44 is a radial surface 48 of the lip 28. The lip 28 also has a guiding surface 50 which slopes radially outward and rearward from an inner radial edge 50a forming a border with the radial surface 48. The guiding surface 50 slopes rearward to an outer annular surface 54 of the lip 28. The outer annular surface 54 has formed therein a radially inward extending groove 56 adjacent an outer radially extending face 58 of the stator 26. The groove 56 preferably has a rectangular shaped cross section.

The rotor 24 includes an inner radial section 60 with a rearward radially extending surface 62 and an inner annular surface 64 which extends forward from an outer edge 62a of the rearward radial surface. The rearward radial surface 62 and the inner surface 64 of the rotor are configured to fit adjacent the inner radial surface 46 and inner annular surface 44 of the stator 26 respectively. Extending radially inward from the inner annular surface 64 is a forward radial groove 66 and a rearward radial groove 68. The forward and rearward groove 66, 68 function as a pressure breakdown groove and also provide circumferential paths to drain away any fluids entering an interface 70 formed between the opposing faces of the rotor 24 and stator 26 through a discharge port 72 (FIG. 2a) formed in the stator.

Referring to FIG. 2a, the discharge port 72 is formed in the stator 26 by removal of a small radial section of that portion of the stator forward of a radial plane 73 aligned with the inner radial surface 46. The circulation port 72 therefore extends outward opposite at least a portion of the rearward groove 66 and forward grove 68. During installation, the stator 26 is oriented so that in a situation where the seal assembly 22 is installed in a pump 10 with a horizontal shaft 16, the discharge port extends generally upward at the lowest portion of the stator. The discharge port 72 drains away fluid which may migrate into the interface 70 between the stator and rotor.

Extending radially outward from the inner radial section 60 of the rotor 24 and forward of the inner annular surface 64 is the flange 30. The flange 30 fits outwardly about the lip 28 and includes a forward radial face 76 which is flush with a forward face 78 of the inner radial section 60.

The flange 30 has a radially extending section 82 and an annular section 84 which extends rearward from the outer radial end of the radial section 82. The radial section 82 includes a rearward face 86 which extends radially outward from the inner surface 64 and is dimensioned to conform to the forward radial face 48 of the lip 28.

The radial section 82 also includes a surface 88 which is sloped radially outward and rearward from an outer edge 86a of the rearward face 86 to conform to the sloped guiding surface 50 of the lip 28.

The sloped surface 88 extends from the rearward face 86 to an inner annular surface 92 of the annular section 84 of the flange 30. The inner annular surface 92 is adjacent and conforms to the outer annular surface 54 of the lip 28. A rim 94 depends radially downward from a rearward end 96 of the annular section 84 and is configured to be received in the groove 54 of the lip 28 while still allowing rotational movement of the rotor 24 relative to the stator 26.

The rim 94 is dimensioned so that a radial distance from a centerline 98 of the shaft 16 to a lower annular surface 102 of the rim is less than a radial distance from the centerline 98 of the shaft 16 to the outer annular surface 54 of the lip 28. Thus, the rim 94 forms an interlocking fit between the lip 28 and the flange 30 which maintains the rotor 24 is the proper position relative to the stator 26 as the rotor rotates.

Also, a radial distance from the centerline 98 of the shaft 16 to the lower annular surface 102 of the rim 94 is greater than a radial distance from the centerline of the shaft 16 to the bottom edge 50a of the guiding surface 50 of the lip 28. Thus, when the rotor 24 and stator 26 are coaxially aligned and then brought into contact, the rim 94 engages the guiding surface 50. The guiding surface 50 thereby exerts a radially outward force on the rim 94 and rearward end 96 of the flange 30.

The rotor 24 is made of a suitably flexible and resilient material such as teflon, carbon filled teflon or metal filled teflon or the like. To assemble the sealing assembly of the present invention, the rotor 24 is coaxially aligned with and placed against the stator 26 so that the rim 94 of the rotor contacts the guiding surface 50 of the lip 28. Further movement of the rotor 24 toward the stator 26 causes the guiding surface 50 to deflect the rim 94, and therefore the rearward end 96 of the annular section 84 of the flange 30, radially outward until the lower annular surface 102 of the rim 94 clears the guiding surface 50. The rim 94 then slides along the outer annular surface 54 of the lip 28 until the rim is aligned with the groove 56. When the rim 94 is aligned with the groove 56, the resilient nature of the rotor 24 causes the rearward end 96 of the annular section 84 to spring radially inward from the deflected position, and the rim 94 enters the groove 56 to form an interlocking fit and prevent relative axial movement between the stator 26 and rotor 24.

As noted above, the rearward face 86, sloped surface 88 and annular surface 92 of the flange 30 are configured to conform to the opposing radial surface 48, guiding surface 50, and annular surface 54, respectively, of the lip 28. In addition, the rim 94 on the flange 30 and the sealing groove 56 on the lip 28 are arranged so that when the rim 94 extends into the groove 56, the conforming opposing surfaces of the lip 28 and flange 24 form a portion of a labyrinth sealing interface 110. Also, the rim 94 and groove 56 are dimensioned so that an additional portion of labyrinth sealing interface 110 is established between the groove and rim while still allowing rotational movement of the rotor 24 relative to the stator 26. The fit between the rim 94 and groove 56 inhibits separation of the rotor 24 and stator 26 during rotation of the shaft 16, and thus, operation of the pump 10 and extends the life of the labyrinth seal 22 since the rim becomes the wear point of the seal.

It is important that the flange 30 of the rotor 24 be dimensioned properly so that the flange may outwardly deflect to allow the rim 94 to engage the groove 56. For a rotor 24 and stator 26 assembly that are used on shafts 16 of up to 6 inches in diameter, the radial depth of the groove 56 is preferably about 0.045 inches and the axial distance from the forward edge of the groove 56 to the radial surface 48 is preferably about 0.165 inches. For a rotor 24 and stator 26 assembly that are used on shafts 16 of 6 inches in diameter or greater, the radial depth of the groove 56 is preferably about 0.090 inches and the axial distance from the forward edge of the groove 56 to the radial surface 48 is preferably about 0.165 inches.

The unitization of rotor 24 and stator 26 according to the present invention is accomplished without resort to additional parts and devices. The simplicity of assembly provides for reduced manufacturing costs and extended life of operation of the labyrinth seal assembly 22.

Referring to FIG. 3, alternate embodiments of the rotor 24' and stator 26' of the present invention are illustrated. In the alternate embodiment, the rim 94' is formed on the outer annular surface 54' of the lip 28' of the stator and extends radially outward. The rim 94' is received within the groove 56' formed in the inner annular surface 92' of the flange 30'. The guiding surface 50' is formed on the rearward radial surface 110 of the flange 30' to engage the forward surface 48' of the lip as the lip and flange are brought into engagement with each other. The guiding surface has a radially outer edge 50a' which is a greater radial distance from the centerline 98 of the shaft 16 than the radial distance from an outer annular surface 94a' of the rim 94' to the centerline. Thus, when the rotor 24' and stator 26' are brought into coaxial alignment and forced together, the guiding surface 50' causing the flange 30' to deflect radially outward so that the rim 94' and groove 56' may be axially aligned to form the interlocking fit.

A specific embodiment of the novel locking labyrinth seal assembly according to the present invention has been described for the purposes of illustrating the manner in which the invention may be made and used. It should be understood that implementation of other variations and modifications of the invention in its various aspects will be apparent to those skilled the art, and that the invention is not limited by the specific embodiment described. It is therefore contemplated to cover by the present invention any and all modifications, variations, or equivalents that fall within the true spirit and scope of the basic underlying principles disclosed and claimed herein. For example, the seal is useful in, but not limited to, pumps, motors, gear housings and other rotating equipment.

I claim:

1. A labyrinth seal assembly for providing a seal between a stationary housing and a shaft which rotates about a centerline, the assembly comprising:

a stator having a rearward portion sealingly mounted to the housing and having an opening, the shaft passing through the opening, the stator including an annular lip extending forward from the rearward portion, the annular lip having an outer annular surface, a groove extending radially inward from said outer annular surface and a forward guiding surface sloping radially inward from said outer annular surface, said guiding surface being forward of said groove;

a rotor sealingly mounted about the shaft, said rotor including an outer annular rearward extending flange configured to receive said annular lid and fit about said guiding surface and said outer annular surface of said lip to form at least a portion of a labyrinth seal between said lip and said flange, said outer flange including a downwardly depending rim configured to extend within said groove to form an interlocking fit, and said guiding surface urging said flange to receive said annular lip to facilitate insertion of the lip into the flange such that an interlocking fit is formed to maintain said rotor in a preferred position relative to said stator.

2. The assembly of claim 1 wherein at least one of said stator and said rotor is made of a resilient material.

3. The assembly of claim 2 wherein said at least one is made of a nonmetallic material.

4. The assembly of claim 2 wherein said at least one is made of a metal filled nonmetallic material.

5. The assembly of claim 1 wherein said rotor and said stator is made of a resilient material.

6. The assembly of claim 5 wherein said rotor and said stator are made of a nonmetallic material.

7. The assembly of claim 5 wherein said rotor and said stator are made of a metal filled nonmettalic material.

8. The assembly of claim 1 wherein a radial distance from the centerline of the shaft to an inner annular surface of said rim is less than a radial distance from the centerline to said outer annular surface of said lip.

9. The assembly of claim 5 wherein said radial distance from the centerline of the shaft to said inner annular surface of said rim is greater than a radial distance from the centerline to a lower edge of said guiding surface.

10. A labyrinth seal assembly for providing a seal between a stationary housing and a shaft which rotates about a centerline, the assembly comprising:

a stator having a rearward portion sealingly mounted to the housing and having an opening, the shaft passing through the opening, the stator including an annular lip extending forward from the rearward portion, the annular lip having an outer annular surface; and a rotor sealingly mounted about the shaft, said rotor including a rearward extending flange configured to fit about said outer annular surface of said lip to form at least a portion of a labyrinth seal between said lip and said flange, one of said stator lip and said flange forming a radially extending groove, the other of said lip and said flange forming a circumferential rim configured to extend within said groove to form an interlocking fit wherein said interlocking fit maintains said rotor in a preferred position relative to said stator, one of said lip and said flange made from deformable material to provide a deflecting means for deflecting said flange radially outward when said rotor and said stator are brought into contact with each other to allow said rim to be axially aligned with said groove, said deflecting means returning to an undeflected shape when said lip is received by said flange to provide said interlocking fit therebetween, said deflecting means including a sloped circumferential guiding surface formed in one of a rearward surface of said flange and a forward surface of said lip.

11. The assembly of claim 10 wherein said rim extends radially outward from said outer annular surface of said lip, said groove being formed in an inner annular surface of said flange.

12. The assembly of claim 10 wherein said guiding surface is integrally formed from said rearward surface of said flange, said guiding surface sloping rearwardly and radially outward from an inner annular surface of said flange.

13. The assembly of claim 10 wherein said rotor and stator are made of a resilient material.

14. The assembly of claim 13 wherein said rotor and stator are made of a nonmetallic material.

15. The assembly of claim 14 wherein said rotor and stator are made of a metal filled nonmetallic material.

16. The assembly of claim 11 wherein a radial distance from the centerline of the shaft to an outer annular surface of said rim is less than a radial distance from the centerline to said inner annular surface of said flange.

17. The assembly of claim 16 wherein said radial distance from the centerline of the shaft to said inner annular surface of said rim is greater than a radial distance from the centerline to an upper edge of said guiding surface.

18. The assembly of claim 10 wherein at least one of said stator and said rotor is made of a resilient material.

19. The assembly of claim 18 wherein said at least one is made of a nonmetallic material.

20. The assembly of claim 18 wherein said at least one is made of a metal filled nonmetallic material.

* * * * *

UNITED STATES PATENT AND TRADEMARK OFFICE
Certificate

Patent No. 5,522,601                                         Patented: June 4, 1998

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Patrick T. Murphy, Auburn, N.Y. and James F. Redmond, Palmyra, N.Y.

Signed and Sealed this Sixth Day of October, 1998.           RANDOLPH A. REESE, *SPE*
                                                                                            Art Unit 3626